Figure 1:
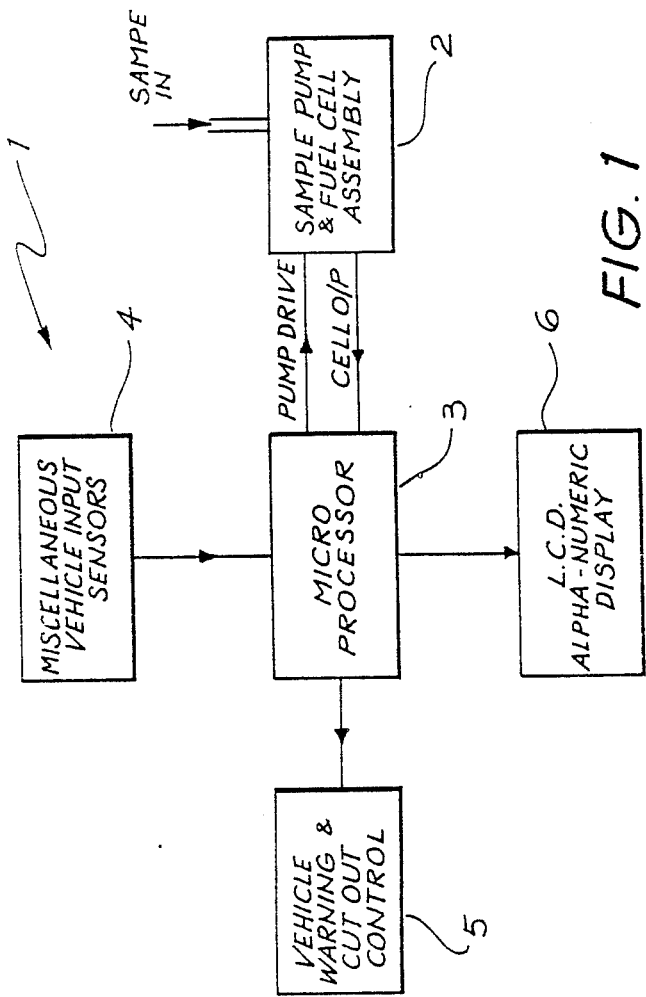

United States Patent [19]

Porter et al.

[11] Patent Number: 4,926,164

[45] Date of Patent: May 15, 1990

[54] VEHICLE BREATH MONITORING DEVICE

[75] Inventors: Anthony Porter, Middle Dural; Robert Breakspere, Yowie Bay, both of Australia

[73] Assignee: Lion Analytics Pty. Limited, Castle Hill, Australia

[21] Appl. No.: 285,544

[22] Filed: Dec. 15, 1988

[30] Foreign Application Priority Data

Dec. 15, 1987 [AU] Australia .............................. PI5902
Dec. 24, 1987 [AU] Australia .............................. PI6085

[51] Int. Cl.⁵ .............................................. B60R 1/00
[52] U.S. Cl. ..................................... 340/576; 128/719
[58] Field of Search ................. 340/576; 128/719, 716

[56] References Cited

U.S. PATENT DOCUMENTS

| | | | |
|---|---|---|---|
| 4,592,443 | 6/1986 | Simon | 340/576 |
| 4,678,057 | 7/1987 | Elfman et al. | 340/576 |
| 4,697,666 | 10/1987 | Collier et al. | 340/576 |
| 4,738,333 | 4/1988 | Collier et al. | 340/576 |
| 4,749,553 | 6/1988 | Lopez et al. | 340/576 |
| 4,809,810 | 3/1989 | Elfman et al. | 340/576 |

*Primary Examiner*—Joseph A. Orsino
*Assistant Examiner*—Geoff L. Sutcliffe
*Attorney, Agent, or Firm*—Ladas & Parry

[57] ABSTRACT

The present invention relates to vehicle breath monitors, and in particular to a vehicle breath monitoring system which either inhibits the starter motor solenoid of a motor vehicle or gives other indication when a driver's breath sample has an alcohol level above the legal limit. The system comprises an electro-chemical fuel cell assembly, which measures the level of ethanol of a breath sample supplied by the driver. The output of the fuel cell is fed to a microprocessor which uses the data as well as data of the ambient condition to determine the alcohol level of the driver's blood. The operation of the system requires the driver to use the system prior to the initial start of the motor vehicle, and a second repeat test to ensure that the alcohol level has not risen over time. If the tests are not passed the system gives an indication to the driver of the results so that the driver can act accordingly.

14 Claims, 5 Drawing Sheets

VEHICLE BREATH MONITORING DEVICE

The present invention relates to vehicle breath monitors and, in particular, to a vehicle breath monitoring system which either inhibits the starter motor solenoid of a motor vehicle or gives indication when a driver's breath sample has an alcohol level above the legal limit.

Since the inception of stringent breath testing facilities conducted by the police authorities, it has become desirable for motorists to be able to test their alcohol level before they attempt to drive their motor vehicle.

A blood alcohol level higher than the stipulated maximum level, will result in the possibility of substantial fines and/or license disqualification.

As well, as the advisability to be able to test alcohol level, there is also the desirability in some circumstances for a lockout device to be attached to the starter motor of motor vehicles, such that the driver if he does have a level of alcohol in his blood over the legal limit will thus not be able to start the vehicle, and thus be protected from possible fines and/or license disqualification.

Possible situations suitable for the installation of this device are in the case of fleet vehicles, taxis, or any motorist who has been disqualified previously. There is also the opportunity for the compulsory installation of these devices in the vehicles of habitual offenders.

A known prior art device is disclosed in U.S. Pat. No. 3,780,311 issued to V. R. Brown. This device is a breath alcohol detector in which there is an automatic interlock in a motor vehicle such that an operator cannot start the engine of the motor vehicle until a breath alcohol test has been passed.

In U.S. Pat. No. 4,039,852 issued to Miyamoto et al, a device is disclosed which provides either a warning or disables the vehicle from being started from the rest condition. This device also detects breakages in the electric circuit and has an indication or disabling when breakages occur.

In U.S. Pat. No. 4,093,945 issued to Collier et al, a device is disclosed which modifies the operation of a motor vehicle after breath test has been taken. The passing signal for the breath test cannot be obtained unless a predetermined continuous and uninterrupted flow has occurred and the resulting sample tests are below a predetermined alcohol concentration.

It is the object of the present invention to provide a starter motor lockout device to prevent the starting of a motor vehicle engine if the vehicle driver has a blood level over the prescribed legal limit.

In accordance with one aspect of the present invention, there is disclosed a vehicle breath monitoring device for a motor vehicle, said device comprising a breath monitoring means and an ambient condition input sensing means both of which are connected as inputs to a processing means, which has an output connected to a starting motor circuit control means and indication means.

Figure 2:
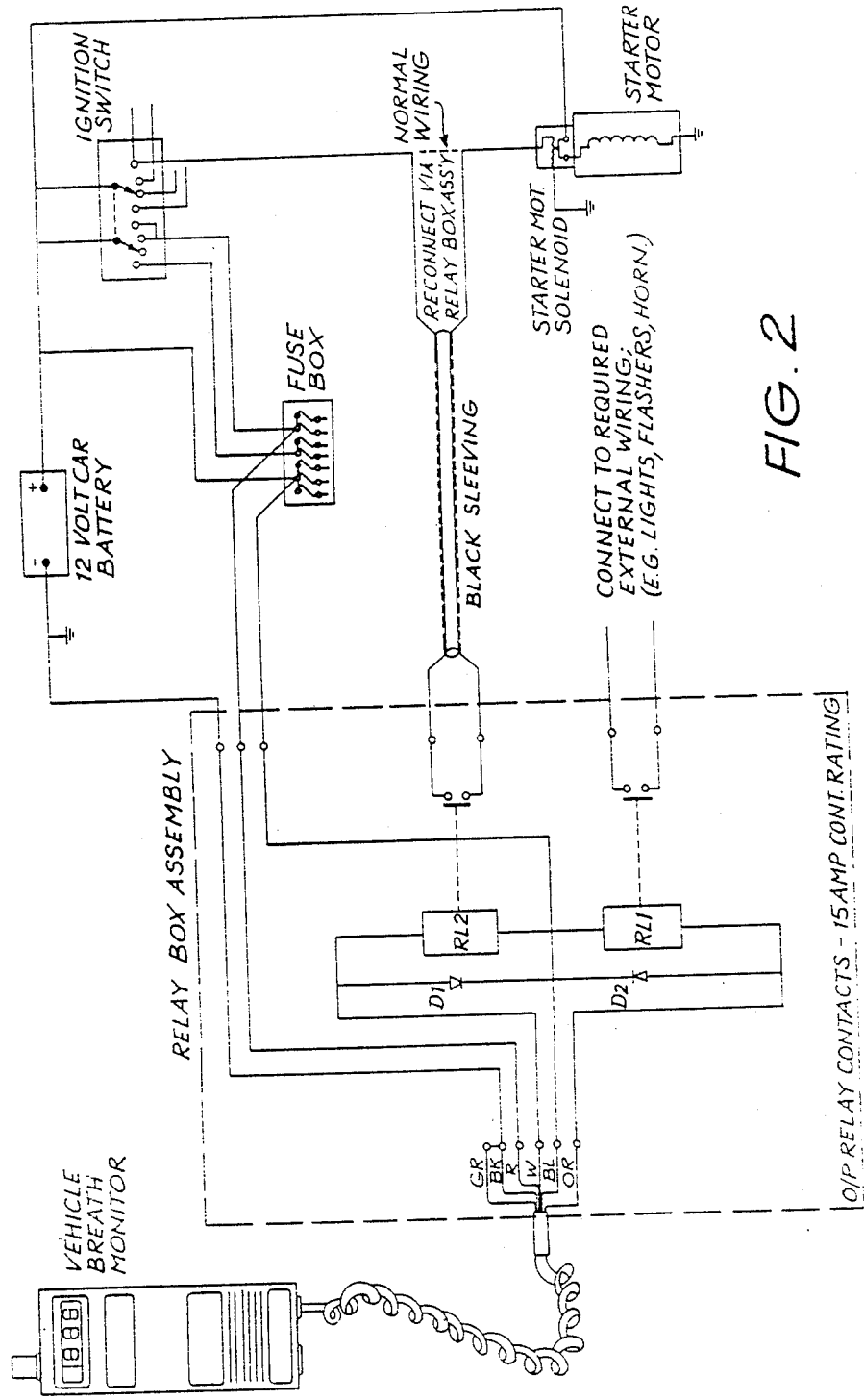
Figure 3:
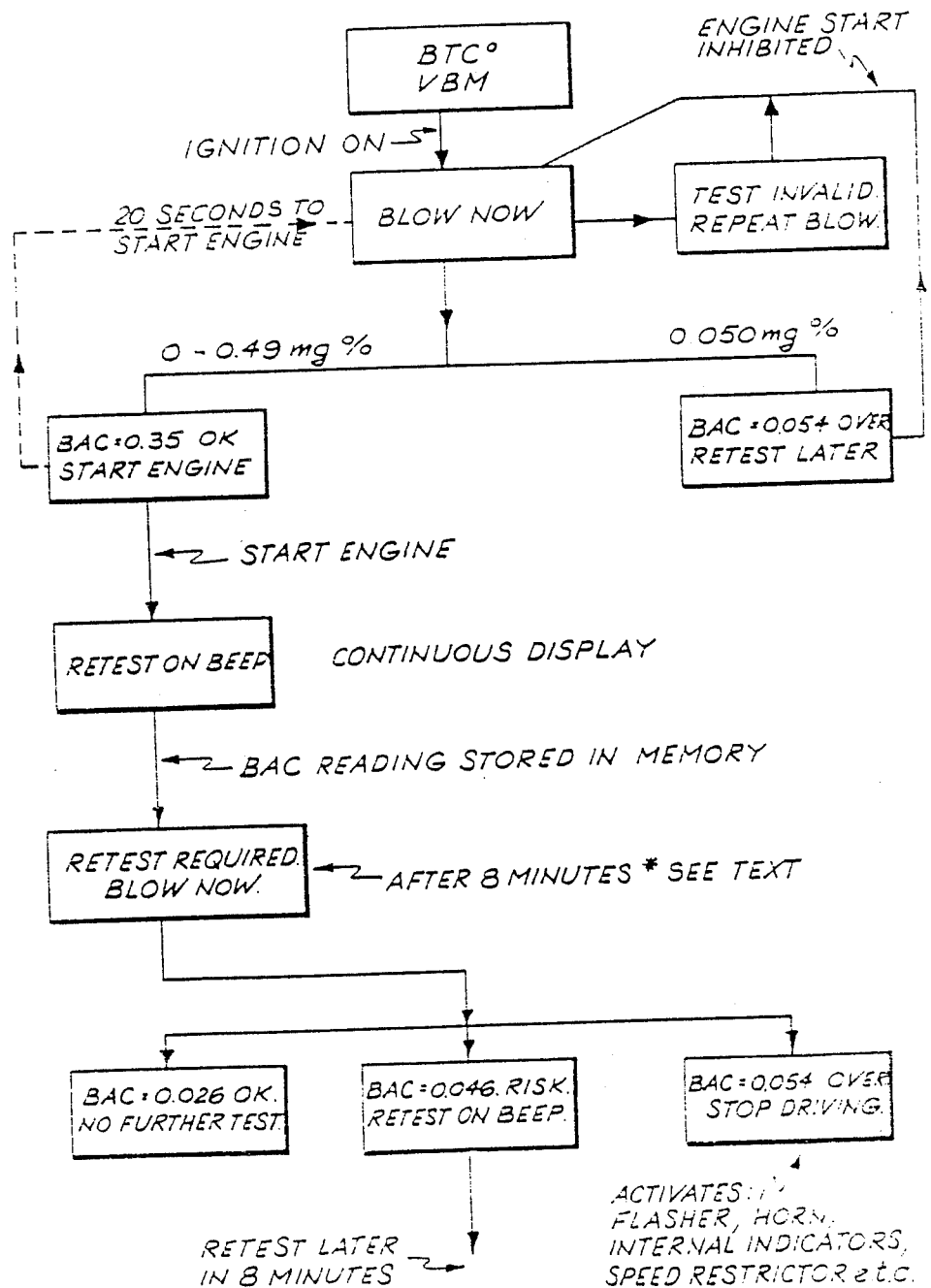
Figure 4A:
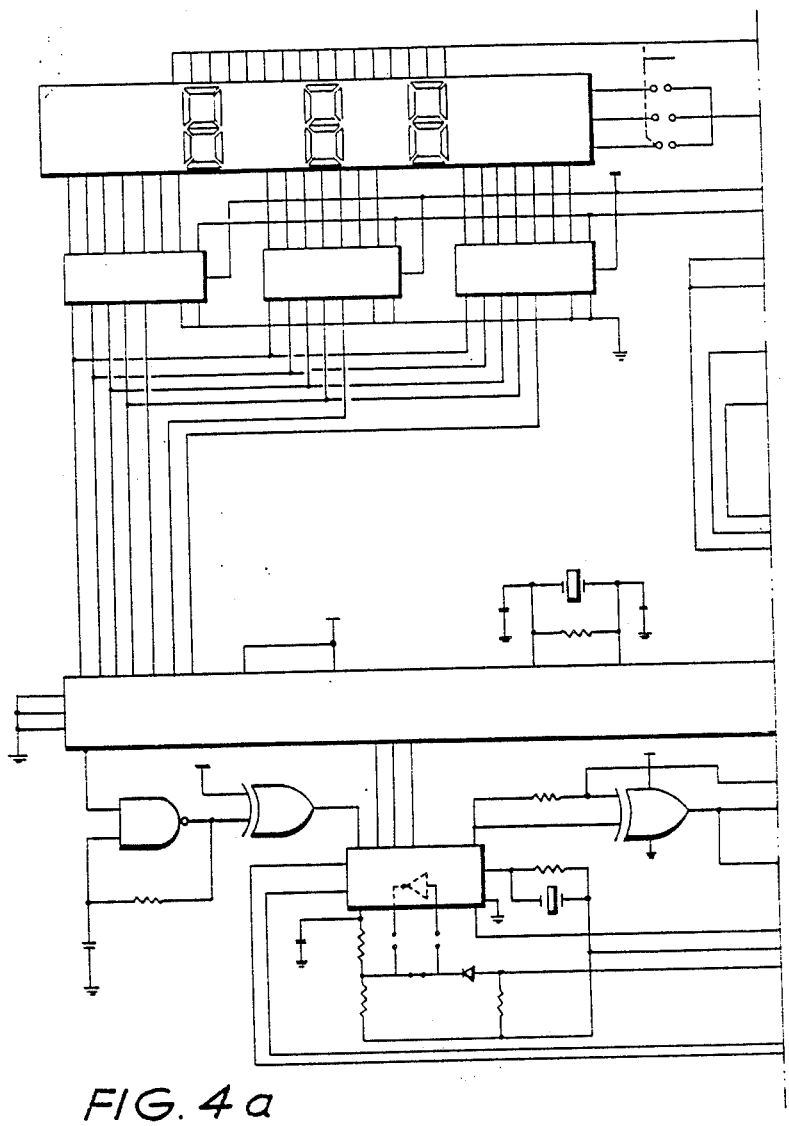
Figure 4A:
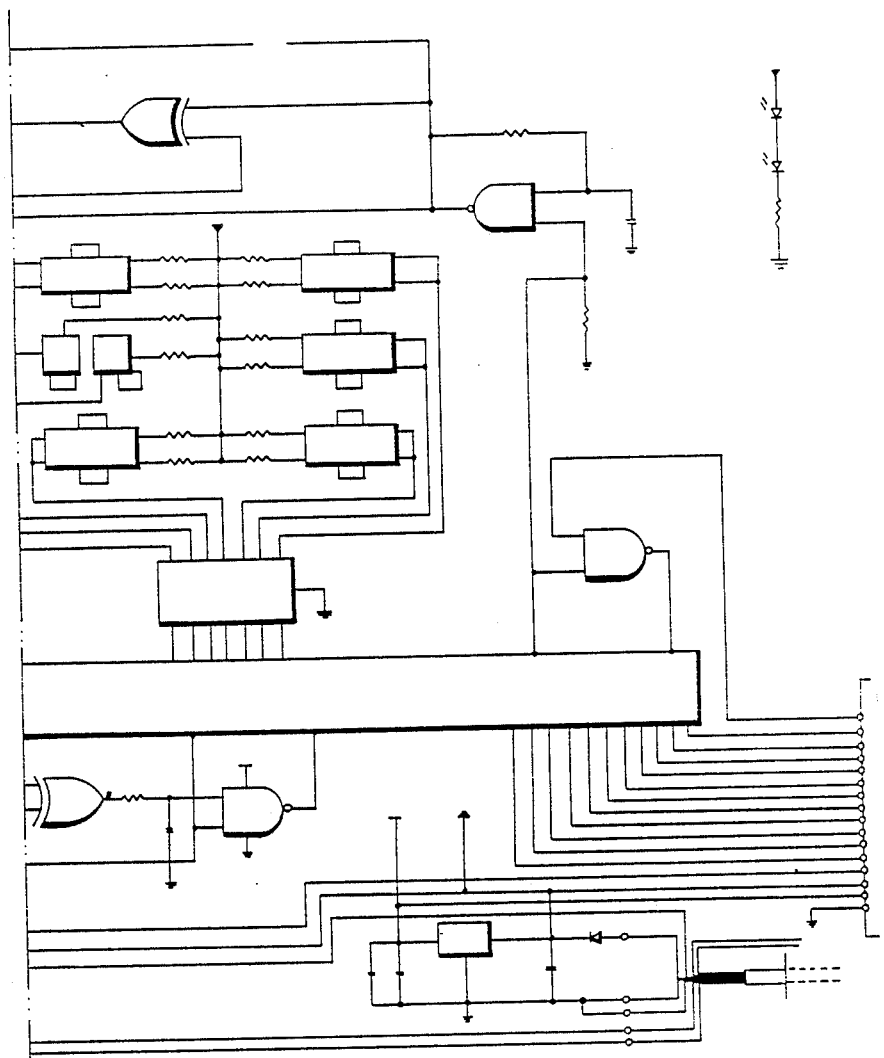
Figure 4B:
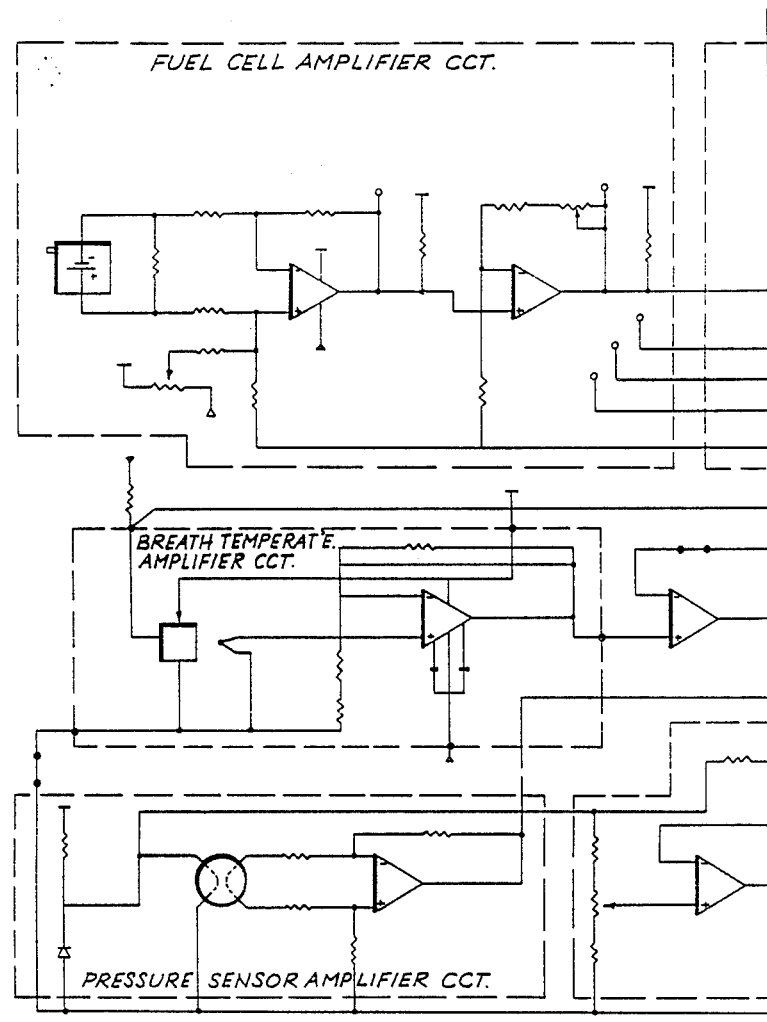
Figure 4B:
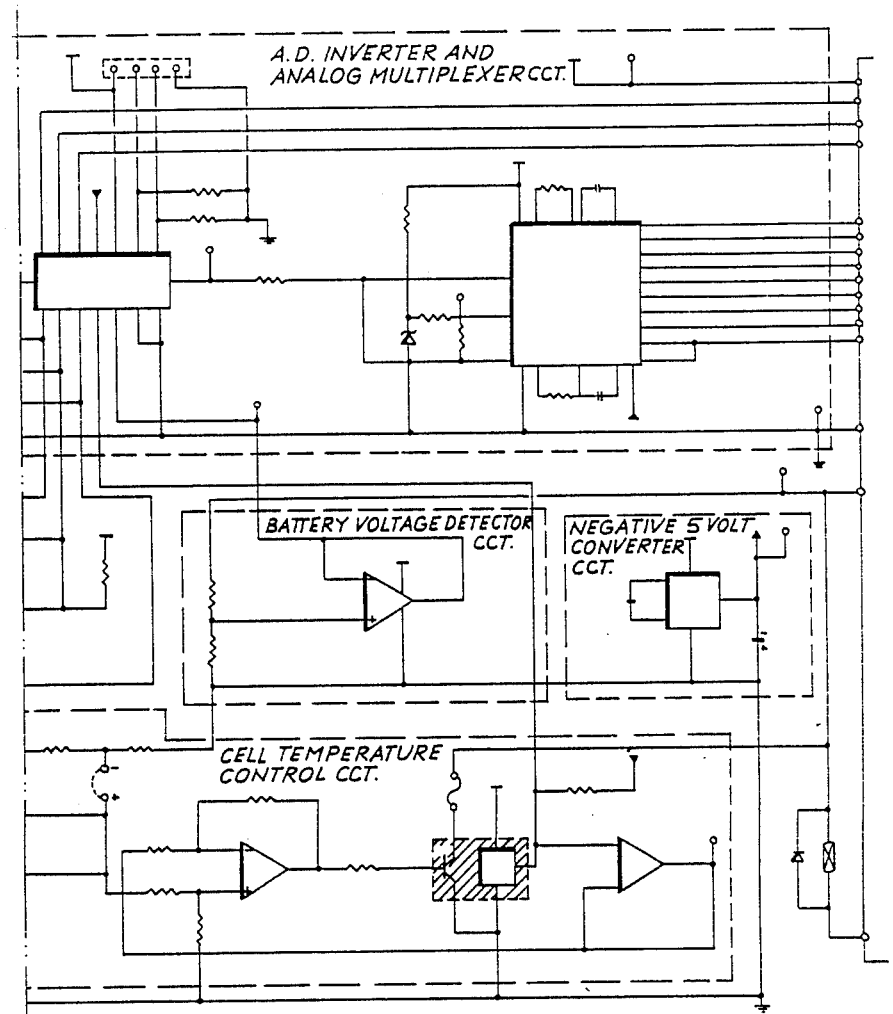

One embodiment of the present invention will now be described with reference to the drawings in which:

FIG. 1 is a block diagram of the starter motor lockout device of the preferred embodiment, FIG. 2 is a vehicle wiring control circuit of the motor lockout device of FIG. 1, FIG. 3 is a flow diagram of the procedure followed in the operation of the device of FIGS. 1 and 2, and FIGS. 4a and 4b are circuit diagrams of the device of FIG. 1.

The starter motor lockout device 1 of the preferred embodiment basically consists of a an electro-chemical fuel cell assembly 2, a microprocessor 3, a miscellaneous vehicle input sensor 4, a vehicle warning and cut-out control device 5 and a liquid crystal display (LDC) segment display 6 connected as illustrated. The fuel cell 2 measures the level of ethanol even in the presence of carbon monoxide, carbon-dioxide, acetone and other respired gases and vapors.

The output of the fuel cell 2 is fed into the microprocessor 3 which is adapted for variable programmes. Fully automatic calibration is possibly by an automatic check re-set (not illustrated). The device 1 has an automatic zeroing function before every test.

The ambient conditions of the vehicle interior, such as temperature is sensed by the sensor 4 and is also inputted into the microprocessors 3 for each test, for correction and/or weighting of obtained results.

The fuel cell 2 measurements provide for blood-breath correlations in excess of 0.95. To take a breath sample the driver blows down a replaceable mouthpiece, the pressure profile of the breath exhalation is monitored and a small volume (0.1 cc) of deep lung air is automatically collected in due course. The alcohol molecules in this sample are oxidized by the fuel cell to produce an electric current which is proportional to the alcohol level.

The operation of the device 1, requires that the driver before the initial start of the vehicle, pass the breath test. To ensure that the driver's alcohol level has not increased over time, a second repeat test is programmed into the device. The repeat test is initiated by an audible bleep and visual "RETEST" which indicates that a test must ensue. The driver can conduct the test of his breath without stopping the vehicle.

If the driver does not pass the second test, the testing device 1 has three options which are available as a single option or as a combination thereof. The options are firstly the indicator lights are initiated with continuous flashing via an external flasher circuit, secondly the head lights are initiated for continuous flashing and the last option is that the horn circuit is initiated for continuous sounding of the horn or external siren.

A number of fail safe and safety features are incorporated in the device 1.

1. Sensors to measure both ambient and breath temperature are incorporated into the device. Breath must enter the fuel cell chamber between 31° and 37° C. for a breath sample to be accepted. Even the change in the temperature of the breath entering the fuel cell after blowing through an absorbance tube (in an attempt to circumvent the device by absorbing the alcohol from the breath sample) is found to be too great to allow a breath sample to be accepted.

2. The gain on the fuel cell output is modified by the microprocessor to accommodate the changes in ambient temperature of the vehicle for operation in harsh climates.

3. The device has an automatic zeroing function before each test to ensure accuracy.

4. An anti-stall overide of 2 minutes is incorporated whereby the engine can be restarted immediately after an engine stall. This overide is, of course, necessary in emergency situations, the overide time period being 2 minutes.

5. The greatest criticism of breath alcohol interlock devices to date, has been (a) the possibility that a friend or passerby may blow into the device and allow an intoxicated motorist to drive, and (b) that a motorist on the alcohol absorption phase may start the engine whilst below the legal limit, but in the course of driving (i.e. with time) exceed the legal level. The device overcomes these criticisms by the incorporation of a memory into the microprocessor. The device requires the motorist who is initially below the legal limit to reset himself/herself 8 minutes after the initial test to prevent driving above the legal alcohol level. (This depends on the legal requirements of the country where apparatus is used). The memory remembers the previous alcohol level and compares it with the second value. Repeated tests every 8 minutes must continue until the motorist enters the elimination phase—assuming he/she always stays below the legal limit. This can best be understood by reference to the flow diagram which shows the sequences of the instrument in a situation where the legal limit is 0.05 mg %.

It is envisaged that the fully automatic interlock device of the present invention can be used for:

(i) after litigation in a variety of ways that have promulgated frequently (ii) in fleets of rental cars, lorries, etc, (iii) as an anti-theft device if supported by insurance companies (iv) by the private motorist who wishes to remain within the drink driving laws.

The device comprises a breath sampling tube with provision for a sample take off, where a prescribed volume of respired air, (a sample of approximately 0.1 cubic centimetre) is taken and injected into the fuel cell for analysis. The process of analysis involves subject injection of ethanol molecules on the electro chemical former within the fuel cell and a proportional signal is developed by the electro chemical reaction on rare metals. In order that deep lung alveolar air is presented for analysis, the sampling system includes a volumetric transducer circuit comprising of a silicon pressure sensor, which with the application of respired air pressure offers a directly proportional voltage output, which is fed into an electronic circuit for conditioning and subsequent integration of peak area count and subsequent calculation for acceptance as a valid sample. This system relies upon a total volume-tric count and is independent of time or a continuous uninterrupted breath pressure, since the count will reduce and resume in the event that the subject interrupts the breath output, provided such interruption is not extended.

As a means of authentication, that the device is subjected to a human breath sample, the device 1 will measure the sample temperature and will only accept this sample if the temperature is between 31° and 37° C.

The secondary means of authenticating the human breath sample involves examination of pressure curve by microprocessor such that curve must fit within human breath profile or again the sample will not be accepted.

The device has integral intelligence with the use of a CMOS 8-bit single chip MCU. Such a device offers 31 bi-directional outputs and inputs which controls the following functions:

Fuel cell input, Breath transducer input, Breath temperature monitoring input, Fuel cell temperature input, Vehicle battery voltage input and Vehicle ignition switch input.

MCU outputs are as follows:

Drive to 3 digit LCD, Display of alcohol, Blow no LED, Retest later LED, Start engine LED, Risk zone LED, Stop driving LED and Over limit LED.

Output relay (1) starter motor cutout.

Output relay (2) miscellaneous for audible visual and alarms.

Output to data storage device.

Output to audible electronic beeper which provides driver commands.

e.g., Beep when breath sample accepted.

Beep with increasing frequency when automatic repeat breath test is required, i.e. second, third, fourth test etc.

Continuous beep when automatic repeat breath test has not been conducted.

Beep to start engine or retest later.

Beeper audible level 85 db.

MCU OPERATIONAL SOFTWARD

Operational integrity of vehicle breath monitor is largely controlled by subsequent software to control multi-functions and provide management of vehicle.

(A) Modes of Operation

This includes an on-going count of breath testing by driver. When at 700 breath tests, the device will exhibit before the next breath test 700 will be exhibited counting up to 750 to warn the driver that at 750 a calibration check is mandatory. In the event that 750 tests are conducted without a calibration check, the device will assume interlock conditions where the visual and audible alarms are initiated.

(B) Software Battery Voltage

Sensing to detect alternative starting methods ensuring that only a human breath sample is taken and used to start the motor vehicle. For example, push start, starting on hills, jumper leads or any bypassing method will cause the vehicle to interlock.

(C) Software Climatic Conditions

In order to satisfy extremes of temperature, the software having received temperature variation inputs from fuel cell sensor software calculations are conducted to maintain fuel cell calibration and accuracy over the vehicle interior temperature range −20° to +70° C.

(D) Software Routine Start-up Operation

The driver will turn on ignition switch and take the device in his/her hand. The device will display BLOW NOW, when the driver will blow continuously until a bleep is heard within a short time when either Start Engine, Over Limit or Risk Zone will be illuminated. Depending upon the concentration of alcohol determined, the driver can either start engine or must wait sufficient time for his/her blood alcohol to reduce to a level where the engine can be started. Provided the driver is able to start the engine he/she can switch off and restart the engine normally without a breath test, provided this is undertaken within a period of 2 minutes. This covers emergency situations. In the event that the sample taken is over the set limit, the driver may retest as often as necessary to test his/her current level until the level is sufficiently reduced.

Irrespective of the results of the first breath test, a second mandatory test is required within 8 minutes of the first test. The driver can conduct this test while the vehicle is on the move. In the event his/her blood alcohol level has increased since the first test and provided it is not now above the pre-set level, a third breath test will be required 8 minutes later (this period varying according to legal requirements of the particular country, when once again the same procedure will be followed. This will continue until no further tests are required i.e. blood alcohol level reducing compared to last test, or the vehicle is placed in the interlock condition i.e. preset level has been exceeded.

(E) Software Invalid Blow

Provision for an unacceptable breath sample by way of short puffs or synthetic circumvention attempts will initiate the retest procedure when in the first instances a longer human breath sample will be accepted for analysis or bypass attempts will cause repeated retests.

The foregoing describes only one embodiment of the present invention and modifications, obvious to those skilled in the art can be made thereto without departing from the scope of the present invention.

What we claim is:

1. A vehicle breath monitoring device for a motor vehicle and its driver, said device comprising a breath monitoring means having an input for accepting a prescribed volume and an output connected as an input to a processing means, an ambient condition input sensing means located adjacent to said breath monitoring means to ensure accuracy of breath monitoring, said ambient condition input sensing means having an output connected as an input to said processing means, the output of said ambient condition sensing modifying the data received by said processing means to reflect changes in ambient temperature, and said processing means providing an output signal in accordance with said modified data to either a starter motor circuit control means, or to an indication means, starting of said starter motor being inhibited or said indication means being energized unless the alcohol concentration of respired air of said driver as detected by said breath monitoring means and modified by said processing means is less than a predetermined limit stored in said processing means.

2. A vehicle breath monitoring device according to claim 1, wherein the breath monitoring means input requires a deep lung alveolar air sample is taken, and said breath monitoring means comprises a sampling system including a volumetric transducer circuit which relies on a total volumetric count and is independent of time or a continuous uninterrupted breath pressure, a temperature sensing means which measures the temperature of said breath sample, and a pressure sensing means to compare the pressure of said breath sample with the profile of a human breath pressure curve, each of said sampling system, temperature sensing means and pressure sensing means being arranged to inhibit the output of the breath monitoring means if predetermined limits are exceeded.

3. A vehicle breath monitoring device according to claim 2 wherein said processing means includes timer means which require that, after the initial start of the vehicle, the drive take a second test within a predetermined time to ensure the driver's alcohol level has not increased between tests and wherein the second test is conducted without the processing means stopping the vehicle.

4. A vehicle breath monitoring device according to claim 2 wherein the temperature sensing means predetermined limit requires the breath temperature to be in the range 31° C. to 37° C.

5. A vehicle breath monitoring device according to claim 3 wherein a memory means connected to said processing means stores the modified data of the previous alcohol level and said processing means compares the stored modified data with the present test level to ensure the test is being carried out by the same person, and if the comparison is within a permissible range, the timer means requires the test be repeated after the expiration of said predetermined time until the driver enters an elimination stage where the alcohol level has decreased to a certain predetermined level.

6. A vehicle breath monitoring device according to claim 5 wherein said memory means stores the number of tests conducted and a calibration check is mandatory after a predetermined number of tests.

7. A vehicle breath monitoring device according to claim 6 wherein said processing means comprises a microprocessor.

8. A vehicle breath monitoring device according to claim 2 wherein said sampling system samples a 0.1 cc volume of exhaled breath.

9. A vehicle breath monitoring device for a motor vehicle and its driver said device comprising a breath monitoring means having an input for accepting a prescribed volume and an output connected as an input to a processing means, an ambient condition input sensing means located adjacent to said breath monitoring means to ensure accuracy of breath monitoring, said ambient condition input sensing means having an output connected as an input to said processing means, the output of said ambient condition sensing means modifying the data received by said processing means to reflect changes in ambient temperature, and said processing means providing an output signal in accordance with said modified data to either a starter motor circuit control means or to an indication means, starting of said starter motor being inhibited or said indication means being energized unless the alcohol concentration of respired air of said driver as detected by said breath monitoring means and modified by said processing means is less than a predetermined limit stored in said processing means, wherein the breath monitoring means input requires that a deep lung alveolar air sample is taken, and said breath monitoring means comprises a sampling system including a volumetric transducer circuit which relies on a total volumetric count and is independent of time or a continuous uninterrupted breath pressure, a temperature sensing means which measures the temperature of said breath sample, and a pressure sensing means to compare the pressure of said breath sample with the profile of a human breath pressure curve, each of said sampling system, temperature sensing means and pressure sensing means being arranged to inhibit the output of the breath monitoring means if predetermined limits are exceeded, where said processing means includes timer means which require that, after the initial start of the vehicle, the driver take a second test within a predetermined time to ensure the driver's alcohol level has not increased between tests and wherein the second test is conducted without the processing means stopping the vehicle.

10. A vehicle breath monitoring device according to claim 9 wherein the temperature sensing means predetermined limit requires the breath temperature to be in the range of 31° C. to 37° C.

11. A vehicle breath monitoring device according to claim 9 wherein a memory means connected to said processing means stores the modified data of the previous alcohol level and said processing means compares the stored modified data with the present test level to ensure the test is being carried out by the same person, and if the comparison is within a permissible range, the timer means requires the test be repeated after the expiration of said predetermined time until the drive enters an elimination stage where the alcohol level has decreased to a certain predetermined level.

12. A vehicle breath monitoring device according to claim 11 wherein said memory means stores the number of tests conducted and a calibration check is mandatory after a predetermined number of tests.

13. A vehicle breath monitoring device according to claim 12 wherein said processing means comprises a microprocessor.

14. A vehicle breath monitoring device according to claim 9 wherein said sampling system samples a 0.1 cc volume of exhaled breath.

* * * * *